Sept. 11, 1923.

J. A. SKAGGS

FOOT REST AND CHAIN KIT

Filed Oct. 4, 1922

1,467,884

Inventor
J. A. Skaggs
By Frease and Bond
Attorneys

Patented Sept. 11, 1923.

1,467,884

UNITED STATES PATENT OFFICE.

JAMES A. SKAGGS, OF CANTON, OHIO.

FOOT REST AND CHAIN KIT.

Application filed October 4, 1922. Serial No. 592,249.

*To all whom it may concern:*

Be it known that I, JAMES A. SKAGGS, a citizen of the United States, residing at Canton, in the county of Stark and State of Ohio, have invented a new and useful Foot Rest and Chain Kit, of which the following is a specification.

This invention relates to improvements in foot rests for use in automobiles and similar vehicles, and has for its objects to provide a removable, hollow foot rest which provides a receptacle in which to store the antiskid chains or similar articles and which may be removed from the automobile and used to carry water, gasoline or the like in case of emergency.

The above and other objects may be attained by forming the foot rest of a hollow cylinder closed at one end and provided with a removable cap for closing the other end, fixed brackets being provided upon the floor of the automobile for detachable connection to the end portions of the foot rest, a spring bail being carried within the hollow cylinder and arranged to be connected to the upper open end portion thereof to provide a bucket.

A preferred embodiment of the invention is illustrated in the accompanying drawing, in which—

Figure 1:
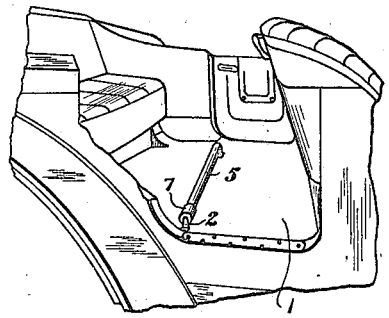
Figure 2:
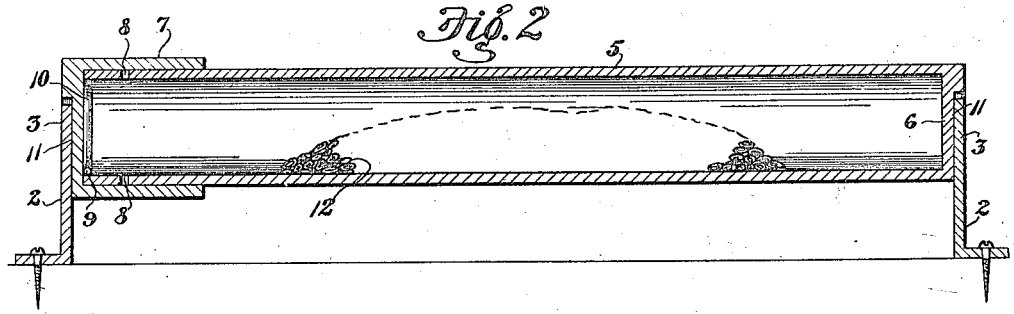
Figure 3:
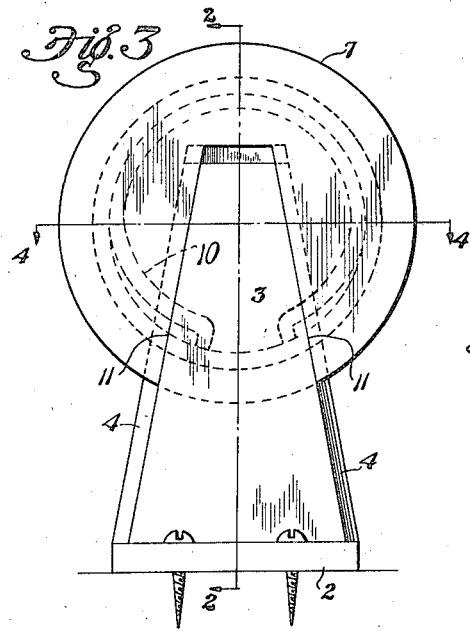

Figure 1 is a perspective view of a portion of an automobile showing the improved foot rest mounted therein;

Fig. 2, a longitudinal, sectional view through the improved foot rest;

Fig. 3, an end view of the same; and

Figure 4:
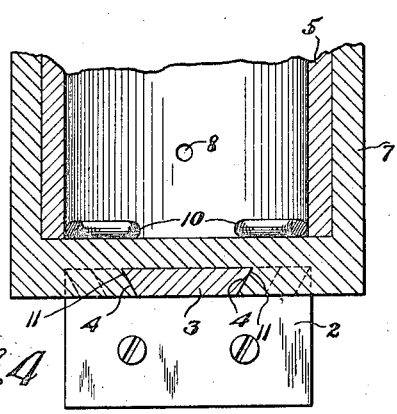

Fig. 4, a section on the line 4—4, Fig. 3.

Similar numerals of reference indicate corresponding parts throughout the drawing.

A portion of an automobile body is shown in Fig. 1, the floor being indicated at 1. A pair of brackets 2 are fixed upon the floor near opposite sides of the automobile, said brackets being provided with the tapered upright portions 3, the side edges of which are outwardly beveled as at 4.

The combined foot rest and receptacle comprises a hollow cylinder 5 closed at one end as at 6, the other end being closed by means of a removable cap 7 and provided with apertures 8 to recive the outturned ends 9 of a spring bail 10, which is normally carried within the receptacle and which may be quickly attached when the receptacle is removed, forming a bucket in which oil or gasoline may be carried in case of emergency.

The closed end 6 of the cylinder and the cap 7 are each provided with the tapered beveled groove 11 arranged to receive the tapered upright 3 of the adjacent bracket. In use, the tire chains as shown at 12, may be placed within the hollow cylinder 5 and the cap 7 placed thereon. The closed end 6 of the cylinder and the cap 7 are then engaged with the tapered uprights 3 of the brackets, said uprights being inserted into the tapered grooves 11 of the closed end and cap, forming a rigid foot rest and at the same time providing a receptacle for storing the tire chains in a place where they are easily accessible.

When it is desired to use the tire chains, it is only necessary to raise the cylinder from engagement with the brackets 2 and remove the end cap in order to remove the chains from the interior thereof. In case of emergency, the hollow cylinder may be used as a receptacle to carry water, gasoline or the like, by disconnecting the same from the brackets 2, removing the cap 7 and inserting the outturned ends 9 of the bail 10 into the apertures 8 by providing a bail or handle, by means of which the receptacle may be carried.

From the foregoing description and an inspection of the drawing, it will be evident that a combined foot rest and chain receptacle is provided which may be rigidly mounted upon the floor of the automobile, and in which the tire chains may be conveniently stored, without sacrificing any space within the vehicle, a receptacle being also provided which may be used in emergencies.

I claim:—

1. A combined foot rest and receptacle comprising a hollow cylinder having one closed end, the other end portion being provided with apertures for the attachment of a bail, a removable cap covering the open end of the cylinder and brackets to which the closed end and cap are detachably connected whereby the removable cap is held in place upon the cylinder.

2. A combined foot rest and chain receptacle comprising a hollow cylinder having one closed end, a removable cap covering the other end and brackets to which said closed end and cap are detachably connected whereby the removable cap is held in place upon the cylinder.

JAMES A. SKAGGS.